Figure 1:
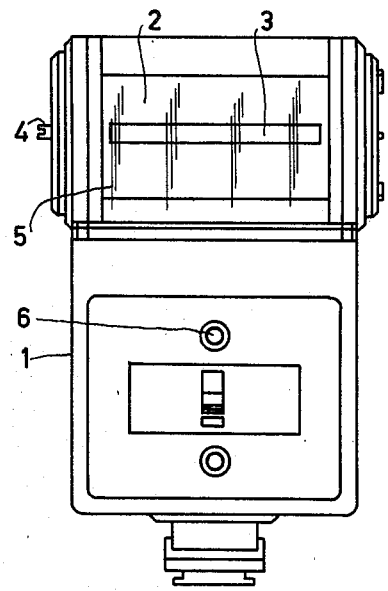

United States Patent [19]

Luursema

[11] 4,327,981
[45] May 4, 1982

[54] ELECTRONIC FLASHGUN

[75] Inventor: Meerten Luursema, Eindhoven, Netherlands

[73] Assignee: U.S. Philips Corporation, New York, N.Y.

[21] Appl. No.: 189,467

[22] Filed: Sep. 22, 1980

[30] Foreign Application Priority Data

Oct. 18, 1979 [NL] Netherlands .......................... 7907684

[51] Int. Cl.³ ............................................ G03B 15/03
[52] U.S. Cl. .................................................. 354/145
[58] Field of Search ...................... 354/32–35, 354/145, 149; 362/3, 8, 9, 17, 18

[56] References Cited

U.S. PATENT DOCUMENTS

| | | |
|---|---|---|
| 4,023,188 | 5/1977 | Ueda et al. ............................ 354/33 |
| 4,175,279 | 11/1979 | Asaki ..................................... 362/18 |
| 4,230,402 | 10/1980 | Uchiyama et al. .............. 354/149 X |

*Primary Examiner*—Donald A. Griffin
*Attorney, Agent, or Firm*—Robert T. Mayer; Bernard Franzblau

[57] ABSTRACT

The invention relates to an electronic flashgun comprising an arithmetic unit (9) for computing a diaphragm stop number-distance combination, the arithmetic unit comprising a transparent element (11) with a pointer (10). This element is connected to a neutral density filter disc (21) having a variable density and located in front of a light cell (6) provided at the light exit side of the flashgun. The pointer directly indicates a diaphragm stop number on a diaphragm stop number scale (13) of the arithmetic unit.

8 Claims, 3 Drawing Figures

ELECTRONIC FLASHGUN

The invention relates to an electronic flashgun having a casing incorporating a reflector with a flash discharge tube. The electronic flashgun comprises an arithmetic unit for computing a diaphragm stop number-distance combination with the arithmetic unit comprising two concentric discs which are rotatable relative to one another. A first one of said discs comprises a scale with diaphragm stop numbers and the second of said discs comprises a scale with distance values, the mutual relative position of the scales being adjustable in dependence upon the value of the sensitivity of the film to be used. The electronic flashgun is provided on the light exit side with a photosensitive cell which is connected to a dosimeter to measure a quantity of light reflected from an object to be photographed and which, after having measured an adjustable dose of light, switches off the flash discharge tube by means of an electric circuit. The dosimeter is adjustable by means of a neutral density filter having an adjustable density and which is movable in front of the photosensitive cell. This neutral density filter is connected to an element having a pointer to indicate the diaphragm stop number to which the camera which, in use, will be connected to the flashgun, must be set, whereafter the arithmetic unit displays the range within which a properly exposed photograph can be made with the camera. Such a flashgun is sometimes called a computer-type flashgun.

The neutral density filter which can be placed in front of the photosensitive cell has a gradually varying density, that is to say that the degree to which light is passed differs for different portions of the filter. Each portion of the filter can be selectively moved in front of the photosensitive cell. The expression "neutral density filter" as used here must also be understood to include other means which can achieve this effect, such as a shielding plate with which a portion of the photosensitive cell can be optionally covered.

German Auslegeschrift No. 1,917,934 discloses an electronic flashgun of the type described in the opening paragraph, wherein the first disc having the diaphragm stop number is rigidly connected to the casing of the electronic flashgun. The second disc is rotatable behind the wall of the casing and has a film sensitivity scale, the distance value scale and a second diaphragm stop number scale. The user can read the different numbers through openings in the casing walls. A pointer on the second diaphragm stop number scale indicates the diaphragm stop number to which the camera must be set, whereas the separate arithmetic unit (formed by the first and the second disc) displays the range within which a properly exposed photograph can still be made with the camera. The user must therefore read two scales, which increases the risk of mistakes. In addition, the rotatable disc in this known electronic flashgun has a large number of diaphragm stop numbers, only a few of which are visible through one of the openings in the wall of the casing and can be indicated by the pointer. This means that the manufacture of the electronic flashgun and the disc requires a great deal of precision.

It is an object of the invention to provide an electronic flashgun which can be made in a simple manner and with which the chance of mistakes during use is reduced.

According to the invention an electronic flashgun of the type described in the opening paragraph is characterized in that the concentric discs are rotatable around a shaft, one end of which is connected to the neutral density filter and the other end to the element with the pointer, which pointer directly indicates the appropriate diaphragm stop number on the diaphragm stop number scale of the arithmetic unit.

In an electronic flashgun according to the invention mistakes during use are substantially impossible as the pointer directly indicates the appropriate stop. As there is no separate number scale, the arithmetic unit of an electronic flashgun according to the invention is not only easy to handle but can also be produced in a relatively simple manner. The construction makes it possible to use a neutral density filter having an infinitesimal varying density. The so-called computer range of the electronic flashgun is then continuously adjustable so that the photographer, when photographing an object located at a certain distance from the camera, has the largest conceivable freedom as regards the choice of the diaphragm stop number.

The element with the pointer preferably consists of a rotatable transparent disc having a hair line (serving as the pointer), which disc can be rotated over the discs of the arithmetic unit. An element which can be used in such a simple manner can be produced without any difficulties.

In an embodiment of an electronic flashgun the pointer is rotatable to a position in which the photocell is switched-off. A portion of the neutral density filter which does not transmit light is then, for example, present in front of the photocell. The computer of the flashgun is then in the switched-off condition.

In a different embodiment the second disc (the disc bearing the distance value scale) is lockable in three positions relative to the casing. These positions correspond to the choice of a refractor which is provided, for example, in front of the aperture of the reflector of the flashgun. Such a refractor is preferably used to adapt the flash when a telelens or a wide-angle-lens is used as the objective on the camera. By rotating the second disc relative to the casing it is possible to adapt the value of the guide number (i.e. the number indicating the product of diaphragm and distance) to the refractor.

In a further embodiment the pointer is rotatable to a position in which the quantity of light to be emitted by the flash discharge tube is adjustable. In this manner it is possible to determine the guide number manually. The quantity of light to be emitted can be reduced by decoupling the photosensitive cell from the electric circuit by means of a switch and by simultaneously switching on other electric components (such as impedances included in an electric circuit).

The invention will now be further explained by way of example with reference to the accompanying drawing.

Figure 2:
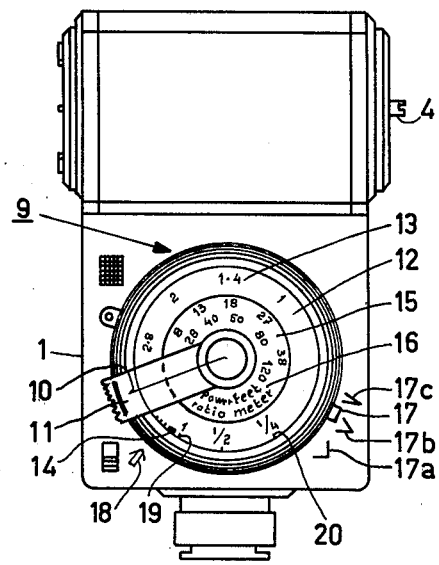
Figure 3:
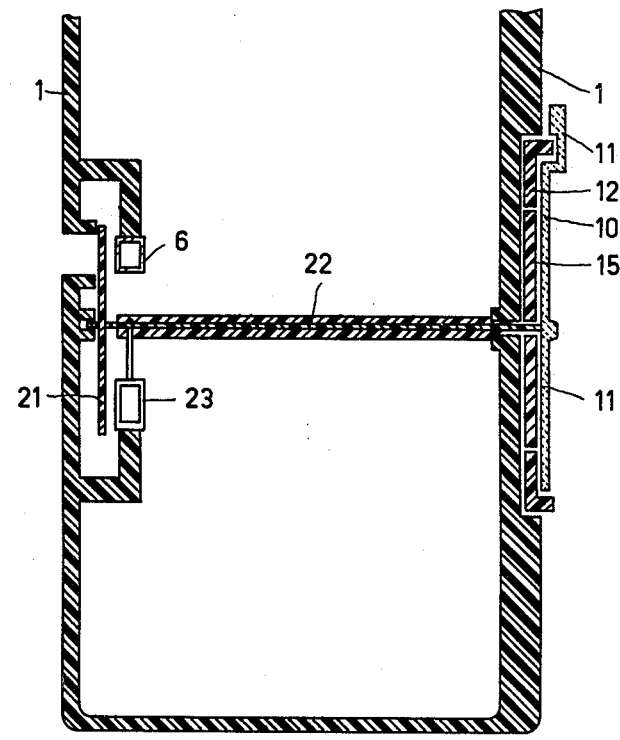

In the drawing;

FIG. 1 is a front view of an embodiment of an electronic flashgun according to the invention, FIG. 2 is a rear view of the flashgun shown in FIG. 1, and FIG. 3 shows schematically and in cross-section an arithmetic unit and a neutral density filter connected thereto.

Referring to FIG. 1, the synthetic material casing of the electronic flashgun is denoted by 1. The casing incorporates an elongate reflector 2 with a flash discharge tube 3. The reflector 2 is rotatable around its longitudinal axis by means of a handle 4 accomodated in the side wall of the casing. In the region 5 of the light exit aperture of the reflector the wall of the casing is transparent. On the light-emitting side of the flashgun there is a photosensitive cell 6, which is connected to a dosimeter to measure a quantity of light reflected from an object to be photographed. By means of an electric circuit in the flashgun the dosimeter switches the flash distance tube off after having measured an adjustable predetermined dose of light. This dose is adjustable by means of a neutral density filter disc 21, which can be moved to in front of the cell 6 (see FIG. 3). This filter disc has twelve segments whose light transmission capability becomes increasingly higher in an increasing sequence from complete opacity onwards. The neutral density filter has a substantially infinitesimal varying density, that is to say the density varies continuously from very dense to a density nearly zero. The neutral density filter 21 is connected by a shaft 22 to a transparent cursor 11 having a hair line 10 (see FIGS. 2 and 3), which serves as the element with the pointer of an arithmetic unit 9 (see FIG. 2) located on the back of the casing of the flashgun. The arithmetic unit 9 is used to calculate a diaphragm stop number-distance combination. The pointer (hair line 10) indicates directly on the arithmetic unit 9 the diaphragm stop number to which the camera connected to the electronic flashgun must be set, whereafter the arithmetic unit shows directly the range within which a properly exposed picture can be made with the camera. The transparent cursor is rotatable relative to the casing as well as relative to the discs of the arithmetic unit. The arithmetic unit 9 comprises two concentric discs 12 and 15 which are rotatable relative to one another, rotation being effected at an end of shaft 22 (see FIG. 3). FIG. 2 shows these discs in greater detail. Disc 12 comprises a diaphragm stop number scale 13 and a scale 14 which is marked with values of the sensitivity of a film with which the camera has been loaded. The second disc 15 comprises a distance scale 16. The neutral position of the two discs depends on the value of the film sensitivity which can be read at arrow 18. The second disc 15 is lockable by means of knob 17 in any of three positions relative to the casing 1. These positions can optionally be set by the user by means of a snap mechanism when a wide-angle, a standard, and a tele-objective, respectively, are used on the camera. The said positions are respectively denoted by 17a, 17b and 17c.

The transparent cursor 11 with the hair line 10 is connected to the neutral density filter disc 21 and is optionally rotatable to such a position that a filter segment which is impermeable to light is present in front of the photo-cell. The pointer 10 is rotatable to such a position that the quantity of light emitted by the flash discharge tube is reduced to half or a quarter of the original quantity (so-called "Power ratio" setting). Disc 12 then assumes a fixed position relative to the element 11 for a given interval 19-20. At the same time the photo-cell is decoupled from the electric circuit and resistors are switched into the electric circuit.

In FIG. 3 the wall of the casing is denoted by 1. On the front (the left hand face as viewed in FIG. 3) there is the photosensitive cell 6, which is connected to the flash discharge tube by an electric circuit. The neutral density filter disc arranged in front of the cell is denoted by 21 and is located at the end of a shaft 22, which, on the other side of the casing, is connected to the previously mentioned transparent cursor 11 with the pointer 10. The shaft passes through the common point of rotation of the concentric discs 12 and 15.

Element 11 with pointer 10 can be rotated to such a position that, by means of a switch 23, the photosensitive cell 6 is decoupled from the electric circuit comprising the flash discharge tube and other electric components are included in the electric circuit instead of the cell, such that the quantity of light emitted by the flash discharge lamp can be set to values $\frac{1}{2}$ and $\frac{1}{4}$ of the maximum quantity which can be emitted by the flash discharge lamp.

What is claimed is:

1. An electronic flashgun for use with a camera comprising, a casing incorporating a reflector with a flash discharge tube, an arithmetic unit for computing a diaphragm stop number-distance combination and comprising two concentric discs rotatable relative to one another, a first one of said discs having a scale with diaphragm stop numbers and the second of said discs having a scale with distance values, the mutual relative position of the scales being adjustable dependent upon the value of the film sensitivity, a photosensitive cell provided on the light exit side of the flashgun and connected to a dosimeter to measure a quantity of light reflected from an object to be photographed and which, after having measured an adjustable dose of light, switches off the flash-discharge tube by means of an electric circuit, the dosimeter being adjustable by means of a neutral density filter having an adjustable density and which is movable in front of the photosensitive cell, said neutral density filter being connected to an element having a pointer to indicate the diaphragm stop number to which the camera must be set, whereafter the arithmetic unit displays the range within which a properly exposed photograph can be made, and wherein the concentric discs are rotatable about a shaft having one end connected to the neutral density filter and the other end to the element with the pointer whereby the pointer directly indicates the appropriate diaphragm stop number on the diaphragm stop number scale of the arithmetic unit.

2. An electronic flashgun as claimed in claim 1, wherein the element with the pointer comprises a transparent disc with a hairline which disc is rotatable over the discs of the arithmetic unit.

3. An electronic flashgun as claimed in claim 1 or 2, wherein the element with the pointer can be rotated to a position to switch off the photosensitive cell.

4. An electronic flashgun as claimed in claim 3, wherein the element with the pointer is rotatable to a position in which the emitted light of the flash discharge tube is adjustable.

5. An electronic flashgun as claimed in claim 1 or 2 including means for temporarily locking the second disc in any of three positions relative to the casing.

6. An electronic flashgun as claimed in claim 1 or 2 wherein the element with the pointer can be rotated to a position in which the quantity of light to be emitted by the flash discharge lamp is adjustable.

7. An electronic flashgun as claimed in claim 1 or 2 wherein the neutral density filter comprises a disc having an infinitesimal varying density.

8. An electronic flashgun for a camera comprising, a casing for housing a reflector and a flash discharge tube, an arithmetic unit for deriving a diaphragm stop number-distance combination and comprising first and second concentric discs rotatable about a shaft relative to one another, the first disc having a scale with diaphragm stop numbers and the second disc having a scale with distance values and with the mutual relative position of the scales being manually adjustable dependent upon the value of the film sensitivity, a photosensitive cell located so as to respond to light reflected from an object to be photographed to provide a signal for a dosimeter to switch off the flash tube, a neutral density filter having a variable density coupled to one end of said shaft and moveable in front of the photosensitive cell and with the dosimeter being varied by said filter position, a pointer element coupled to the other end of the shaft for indicating the diaphragm stop number for the camera so that the arithmetic unit displays the correct range value, the pointer element directly indicating the diaphragm stop number on the diaphragm stop number scale of the arithmetic unit.

* * * * *

UNITED STATES PATENT AND TRADEMARK OFFICE
CERTIFICATE OF CORRECTION

PATENT NO. : 4,327,981
DATED : May 4, 1982
INVENTOR(S) : Meerten Luursema

It is certified that error appears in the above-identified patent and that said Letters Patent are hereby corrected as shown below:

Col. 1, line 39, change "with" to --by means of--

Col. 4, line 53, change "claim" to --claims-- line 56, change "claim" to --claims-- line 59, change "lamp" to --tube-- line 60, change "claim" to --claims--

Signed and Sealed this

Thirty-first Day of August 1982

[SEAL]

Attest:

Attesting Officer

GERALD J. MOSSINGHOFF
Commissioner of Patents and Trademarks